United States Patent
Jones et al.

(10) Patent No.: US 7,298,702 B1
(45) Date of Patent: Nov. 20, 2007

(54) METHOD AND SYSTEM FOR PROVIDING REMOTE TELEPHONE SERVICE VIA A WIRELESS LOCAL AREA NETWORK

(75) Inventors: Bryce A. Jones, Overland Park, KS (US); Jason R. A. Delker, Olathe, KS (US); John M. Everson, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1103 days.

(21) Appl. No.: 10/325,400

(22) Filed: Dec. 20, 2002

(51) Int. Cl.
*H04J 1/16* (2006.01)
*H04J 3/16* (2006.01)
*H04Q 7/24* (2006.01)
*H04L 12/66* (2006.01)
*H04L 12/56* (2006.01)

(52) U.S. Cl. ............... 370/235; 370/338; 370/356; 370/389; 370/392; 370/401; 370/420; 370/466

(58) Field of Classification Search ............ None
See application file for complete search history.

(56) References Cited

U.S. PATENT DOCUMENTS

| | | | |
|---|---|---|---|
| 6,055,575 A * | 4/2000 | Paulsen et al. ............ | 709/229 |
| 6,594,246 B1 | 7/2003 | Jorgensen | |
| 6,711,678 B2 * | 3/2004 | Ferguson ................ | 713/153 |
| 6,765,881 B1 * | 7/2004 | Rajakarunanayake ....... | 370/256 |
| 6,795,701 B1 | 9/2004 | Baker et al. | |
| 6,970,459 B1 * | 11/2005 | Meier .................... | 370/389 |
| 7,020,084 B1 * | 3/2006 | Tanaka et al. ............ | 370/235 |
| 7,062,566 B2 * | 6/2006 | Amara et al. ............. | 709/229 |
| 7,069,433 B1 * | 6/2006 | Henry et al. ............. | 713/151 |
| 7,117,526 B1 * | 10/2006 | Short .................... | 726/5 |
| 2003/0087629 A1 | 5/2003 | Juitt et al. | |
| 2003/0152068 A1 | 8/2003 | Balasaygun et al. | |
| 2004/0122956 A1 | 6/2004 | Myers et al. | |

OTHER PUBLICATIONS

U.S. Appl. No. 10/229,703, filed Aug. 28, 2002 entitled "Method and System for Initiating a Virtual Private Network over a Shared Network on Behalf of a Wireless Terminal" (Sprint Docket No. 1825).

Sprint Wholesale: Products: Voice: Voice VPN, http://www.sprintbiz.com/wholesale/products/vpn.html, printed from the World Wide Web on Oct. 2, 2002.

(Continued)

*Primary Examiner*—Chi Pham
*Assistant Examiner*—Melanie Jagannathan (57) ABSTRACT

A method and system for providing remote voice communication service via a wireless local area network (WLAN). A WLAN access point is arranged with predefined security settings to establish a VPN tunnel over a packet network with a VPN terminator on a remote network. The access point then wirelessly receives voice traffic from a wireless terminal operating in the WLAN and sends the voice traffic over the VPN tunnel to the remote network, for transmission to a call control device, which provides connectivity with a voice transport network. And the access point similarly receives voice traffic via the VPN tunnel from the remote network and sends the voice traffic wirelessly to the wireless terminal. Advantageously, multiple wireless terminals operating on the WLAN can engage in voice calls concurrently via the access point.

26 Claims, 7 Drawing Sheets

OTHER PUBLICATIONS

Broadsoft: Enterprise Networking, http://www.broadsoft.com/products/applications/enterprise_networking.html, printed from the World Wide Web on Oct. 2, 2002.

Colubris Networks, Wireless LAN Router, CN100, CN1000, CN1050, CN1054, printed from the World Wide Web on Oct. 2, 2002.

SMC Networks Consumer Site: Products: SMC7004WFW—Barricade™ Plus Wireless Cable/DSL Broadband Router, http://www.smc.com/indix.cfm?sec=Products&pg=Product-Details&prod=253&site=c, printed from the World Wide Web on Oct. 7, 2002.

Network World Fusion, Colubris CN1050 wireless LAN router, http://www.nwfusion.com/reviews/2002/0415rev2.html, printed from the World Wide Web on Oct. 7, 2002.

Colubris Networks, CN1054 Wireless LAN Router, 2001.

Trudeau, "Building Secure Wireless Local Area Networks," Colubris Networks, 2001.

Network World Fusion, How is VoIP over a wireless LAN?, http://www.nwfusion.com/newsletters/converg/2002/01539349.html, printed from the World Wide Web on Oct. 15, 2002.

Network World Fusion, ReefEdge Connect System 3.0 targets WLAN security, http://www.nwfusion.com/news/2002/0909reef.html, printed from the World Wide Web on Oct. 15, 2002.

Network World Fusion, Avaya to meld VPNs anv VoIP, http://www.nwfusion.com/news/2002/129521_Jan. 28, 2002.html, printed from the World Wide Web on Oct. 15, 2002.

i-data International, Copenhagen Stock Exchange Message 36/2000, Nov. 1, 2000.

Network World Fusion, Adding voice to VPNs, http://www.nwfusion.com/news/2002/0603vpn.html, printed from the World Wide Web on Oct. 15, 2002.

Network World Fusion, Firewall limits vex VoIP users, http://www.nwfusion.com/news/2002/0708voip.html, printed from the World Wide Web on Oct. 15, 2002.

Snow technology AG—Voice over IP (VoIP) Phones:: Products:: Technology:: STUN, http://www.snomag.de/stun_en.htm, printed from the World Wide Web on Oct. 15, 2002.

Office Action from U.S. Appl. No. 10/327,427, dated Jan. 16, 2007.

* cited by examiner

METHOD AND SYSTEM FOR PROVIDING REMOTE TELEPHONE SERVICE VIA A WIRELESS LOCAL AREA NETWORK

REFERENCE TO RELATED APPLICATIONS

This disclosure is related to two other patent applications filed concurrently with this disclosure, entitled respectively "Method and System for Distribution of Voice Communication Service via a Wireless Local Area Network" and "Method and System for Providing Multiple Connections From a Common Wireless Access Point." Each of these other applications is hereby incorporated by reference in its entirety.

BACKGROUND

1. Field of the Invention

The present invention relates to telecommunications, and more particularly to a method and system for providing remote telephone service via a wireless local area network link.

2. Description of Related Art

In recent years, wireless local area networking has become increasingly popular. Provided with a suitable wireless communication device, a user operating in a wireless local area network (WLAN) can conveniently gain access to network resources without being tethered to a fixed location.

A WLAN can take various forms, one of the most common of which is that described by industry standard IEEE 802.11 (as modified by 802.11b and 802.11a). Applicable details of 802.11 are well known to those of ordinary skill in the art. Other examples of WLAN technology include Bluetooth and HomeRF. And still other examples are now known or will be developed in the future.

Generally speaking, in an 802.11 WLAN (by way of example), one or more access points (APs) are provided as base stations to interface between wireless terminals and a distribution system (e.g., a wired Ethernet or other system). When a wireless terminal first enters an 802.11 WLAN, the wireless terminal becomes associated with a nearby AP and becomes authenticated for purposes of communicating within the WLAN. Depending on the scope of authentication, the wireless terminal may then be able to communicate with other wireless terminals operating on the WLAN and/or with various servers or other entities in the distribution system. Further, the distribution system may provide connectivity with another network such as the Internet for instance. Therefore, the wireless terminal might be able to access resources on that other network as well.

In a typical arrangement, when a private (or pseudo-private) distribution system provides connectivity with a public network such as the Internet, the private system may include a firewall, such as a network address translator (NAT), to secure entities on the private system from exposure to the public network. (NAT is described in Network Working Group Request For Comments (RFC) 1631, "The IP Network Address Translator (NAT)," dated May 1994.) For instance, a NAT router at the edge of the private system could translate between private IP addresses in the private system and public (registered) IP addresses in the public network.

That is, each entity in the private system can have a private (unregistered) IP address to facilitate routing within the private system, and a router or other device sitting at the edge of the private system can have one or more public IP addresses. When an entity in the private system sends a packet to a public IP address, the router would translate the private source address in the packet's header into a particular public IP address/port before routing the packet to its destination in the public network. And when the router then receives an incoming packet destined for that particular public IP address/port, the router would then translate the destination IP address in the packet's header into the private IP address of the entity before routing the packet to the entity in the private network.

While NAT firewalls can work well to secure a private network, however, they can pose problems when it comes to communicating real-time media, such as voice. The reason for this is that most real-time media communications involve both signaling packets (e.g., H.323, RTCP or SIP signals) and bearer packets, and the signaling packets typically follow a protocol that contains address information not just in packet headers but also deeper within the packets, such as within the application layer (usually the payload portion of the packets). Conventional application of NAT to outgoing signaling packets would thus make the packets seem outwardly (in their headers) as if they came from a public network address, but the signaling messages within the packets would reflect the private network address. Consequently, resulting communications (signaling or bearer) from a remote entity in the public network would likely end up being directed to the private address and therefore not make it back to the private network.

SUMMARY

An exemplary embodiment of the present invention provides a method and system for allowing a WLAN voice terminal, such as an 802.11b-capable mobile phone, to engage in voice communication through a calling service hosted by a remotely located network (e.g., a private packet network). To facilitate this, the exemplary embodiment gives the WLAN terminal a link to the remote network and a network address routable in the remote network (e.g., in a domain (e.g., subnet) of the remote network). Thus, the wireless terminal can operate as a node on the remote network to place and receive voice calls, even though the wireless terminal is physically located on a WLAN remote from that network.

According to the exemplary embodiment, a specialized WLAN access point is provided as a "voice access point" (VAP) that can allow a wireless terminal (i) to securely communicate over a packet network (e.g., a public/shared packet network such as the Internet and/or a private packet network) with a remote network and (ii) to make use of a voice calling service on the remote network. For instance, the remote network might include a call control device (such as a PBX server, SIP proxy, IP telephony gateway, etc.) coupled with a voice transport network (such as the public switched telephone network (PSTN), the Internet and/or the remote network), and the wireless terminal may interact with the call control device through a communication path comprising (i) a WLAN link between the wireless terminal and the VAP, (ii) a virtual private network (VPN) tunnel over the packet network, between the VAP and a VPN terminator on the remote network, and (iii) the remote network. In this way, the wireless terminal could operate as a telephony node on the remote network, to securely place and receive calls over the voice transport network via the call control device.

Conveniently, an exemplary VAP may include an integrated VPN client that is pre-configured to establish a VPN tunnel with a VPN terminator on a given remote network, so as to allow a suitably equipped wireless terminal to interact with a call control device on that remote network. For instance, the VAP could be provisioned with security parameters that enable it to engage in both mutual authentication and session key exchange with the VPN terminator, and the VAP could be programmed to use those security parameters to establish a VPN session with the VPN terminator.

Further, an exemplary wireless terminal may be configured in advance with data and logic that enables the wireless terminal to establish a WLAN association with the VAP and that enables the wireless terminal to gain access to the VPN tunnel established by the VAP (and thereby to gain access to the remote network). For instance, the wireless terminal might be programmed to use a particular service set identifier (SSID) (or more generally, a particular network identifier) to associate with the VAP, and to specify that SSID in WLAN communications that the wireless terminal sends to the VAP. And the VAP might be programmed to correlate that SSID with a VPN tunnel to a particular remote network (thus effectively correlating (i) a wireless terminal operating with that SSID with (ii) the VPN tunnel), so that, as the VAP receives voice traffic from the wireless terminal, the VAP routes the voice traffic over that VPN tunnel. Further, the wireless terminal and VAP can be configured to employ wired equivalent privacy (WEP) or some other security measure to safeguard the WLAN communications.

A suitably equipped wireless terminal could then establish a WLAN association with the VAP and, through the VPN tunnel, acquire a network address routable in the remote network. Provided with the network address, the wireless terminal can then readily engage in voice over packet (VoP) communications with the call control device in the remote network, and the call control device can interface those voice communications with the voice transport network.

Advantageously, an entity could use this exemplary system to sell, resell or otherwise provide voice calling services to users of wireless terminals. For instance, a company could sell or distribute VAPs to its employees or customers for the employees or customers to install on their home LANs, and each VAP could be pre-configured to establish a VPN tunnel with a VPN terminator on the company's enterprise network. After installing the VAP, an employee or customer operating a suitably equipped wireless terminal could then readily engage in voice calls through a call control device on the company's enterprise network, via the VAP and VPN tunnel. And the company could charge the employee or customer for placing and receiving those voice calls.

Thus, in one respect, an exemplary embodiment of the invention may take the form of a voice communication system including a wireless access point that can be communicatively connected to a packet network (e.g., to a local area packet network that provides connectivity with another packet network such as the Internet). The wireless access point includes a VPN client configured with a predefined set of VPN security parameters. And after the wireless access point is communicatively connected to the packet network, the wireless access point uses the predefined set of VPN security parameters to establish a VPN tunnel with a VPN terminator on a remote network via a communication path comprising the packet network. The wireless access point then receives outgoing VoP traffic transmitted over an air interface from a wireless terminal and sends the outgoing VoP traffic via the VPN tunnel to the VPN terminator, and the wireless access point receives incoming VoP traffic transmitted over the VPN tunnel from the VPN terminator and sends the incoming VoP traffic wirelessly over the air interface to the wireless terminal.

VoP traffic can flow between the wireless terminal and wireless access point according to a WLAN protocol, such as 802.11, an 802.11 variant, Bluetooth and HomeRF, for instance. In this regard, the VoP traffic can comprise digitized voice encapsulated in data packets, sent over the WLAN protocol. Further, multiple wireless terminals can concurrently engage in VoP communications via the air interface and wireless access point, over a common VPN tunnel or over separate VPN tunnels from wireless access point.

The exemplary voice communication system may further include a VPN terminator. The VPN terminator can receive the outgoing VoP traffic transmitted over the VPN tunnel from the wireless access point, and which can send the outgoing VoP traffic over the remote network to a call control device (e.g., a voice gateway, a computer telephony interface, a switch, a media gateway controller, a private branch exchange server, or a proxy server) that provides connectivity with a voice transport network. And the VPN terminator can receive the incoming VoP traffic transmitted over the remote network from the call control device and send the incoming VoP traffic over the VPN tunnel to the wireless access point, for transmission in turn over the air interface to a wireless terminal.

Further, the voice communication system can also include a dynamic host control protocol (DHCP) server on the remote network. The DHCP server can function to assign to the wireless terminal an IP address in a domain of the remote network (e.g., an local IP address routable in the remote network). The DHCP server can be functionally implemented on the VPN terminator.

Additionally, the voice communication system can include an authentication server on the remote network, which functions to authenticate the wireless terminal when the wireless terminal seeks to engage in voice communication via the call control device.

Still further, the wireless access point can include logic that functions to restrict traffic flow to voice traffic. In this regard, the logic can function to determine whether a communication from the wireless terminal constitutes voice traffic and, only if so, to pass the communication onto the VPN for transmission to the VPN terminator.

Additionally, the wireless access point can include logic to correlate a wireless terminal (e.g., a communication from a wireless terminal) with a given VPN tunnel. In this regard, for instance, the wireless access point can be configured with multiple predefined sets of security settings, which the wireless access point uses to establish a multiple VPN tunnels, each terminating at a respective remote VPN terminator. And the wireless access point can include VPN-selection logic that operates to determine a network identifier (e.g., SSID) in an access request transmitted over the air interface from the wireless terminal, to use the network identifier as a basis to select a given one of the VPN tunnels, and to forward a DHCP request from the wireless terminal over the selected VPN tunnel.

In another respect, an exemplary embodiment may take the form of a voice communication method. The method may involve communicatively connecting, to a packet network, a wireless access point that includes an integrated VPN client configured with a predefined set of VPN security parameters. And the method may then involve the wireless access point using the predefined set of VPN security parameters to establish a VPN tunnel with a VPN terminator on a remote network, via a communication path comprising the packet network.

In turn, the method may involve the wireless access point wirelessly receiving outgoing VoP traffic transmitted over an air interface from one or more wireless terminals and sending the outgoing VoP traffic via the VPN tunnel to the remotely located VPN terminator, as well as receiving incoming VoP traffic transmitted over the VPN tunnel from the VPN terminator and sending the incoming VoP traffic wirelessly over the air interface to one or more wireless terminals.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Architecture

Figure 1:
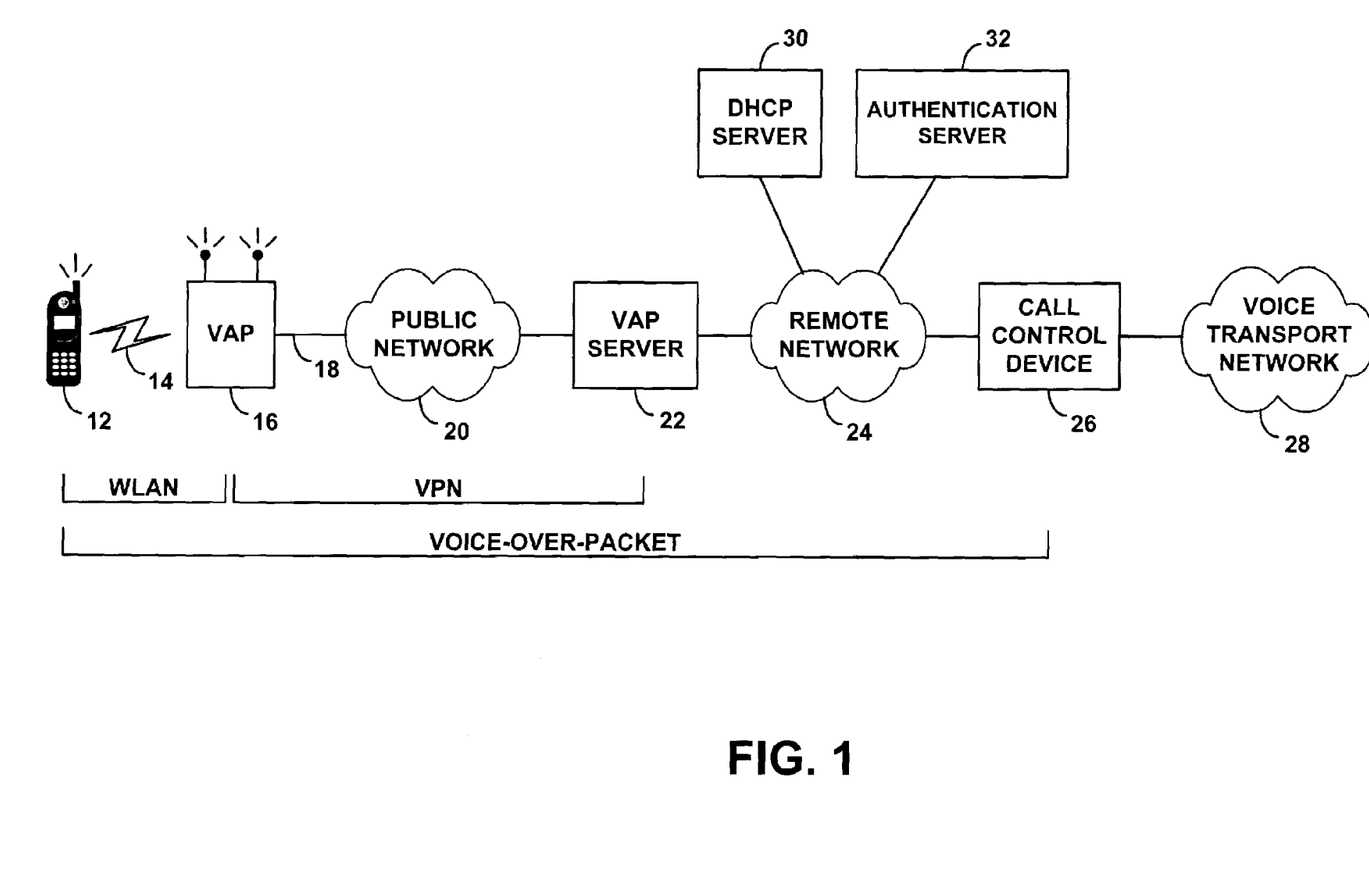
FIG. 1 is a block diagram of an arrangement for implementing the exemplary embodiment.

Referring to the drawings, FIG. 1 is a simplified block diagram illustrating an arrangement for implementing an exemplary embodiment. The arrangement shown in FIG. 1 includes a wireless terminal 12 that communicates wirelessly over an air interface 14 with a VAP 16. The VAP 16 is then coupled by a communication link 18 with a public packet network 20 (and/or a private network) that provides access to a VAP server 22 on a remote network 24. Also sitting on the remote network 24 is a call control device 26 that provides connectivity with a voice transport network 28, a DHCP server 30 that functions to assign network addresses (e.g., IP addresses) for use in the remote network 24, and an authentication server 32 that functions to authenticate users seeking to access services of the call control device 26.

It should be understood that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, many of the elements described herein are functional entities that may be implemented as discrete or distributed components or in conjunction with other components, and in various suitable combinations and locations.

For example, although communication link 18 is shown as a direct line between VAP 16 and public network 20, the link 18 could be far more complex, including one or more network elements (such as a cable modem system, DSL system or home LAN) for instance. As another example, although VAP server 22, call control device 26 and DHCP server 30 are shown as discrete elements, they could be integrated together functionally on a single processing platform. And as yet another example, although voice transport network 28 is shown separate from remote network 24 and public network 20, it is possible that voice transport network 28 could coincide at least in part with these other networks (e.g., the voice transport network could be or include the remote network, the PSTN, and/or public packet network). Other examples are possible as well.

Additionally, various functions described herein as being performed by one or more entities may be carried out by hardware, firmware and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

In the example arrangement shown in FIG. 1, wireless terminal 12 is a wireless terminal that is able to engage in WLAN communication over air interface 14 with an access point such as VAP 16 and to support VoP (e.g., voice-over-IP (VoIP)) network communications, so as to enable a user of the wireless terminal to engage in voice communication with a remote entity. As such, wireless terminal 12 may include components commonly found in commercially available WLAN voice terminals such as those made by Spectralink and Symbol Technologies, for instance.

In particular, to support WLAN communication with VAP 16, wireless terminal 12 can include components conventionally found in a WLAN station. For example, the wireless terminal 12 can include a wireless transceiver, an antenna, and logic to transmit and receive information in a suitable WLAN air interface format such as 802.11, an 802.11 variant (e.g., 802.11a, 802.11b, or later revisions), Bluetooth or HomeRF, for instance. (An exemplary wireless terminal 12 could in fact be a multi-mode device, capable of interfacing with more than one type of air interface.) According to the well known 802.11b standard, for example, the wireless terminal 12 could be provisioned with an SSID that matches an SSID used by VAP 16, so that the wireless terminal 12 can associate with VAP 16, wirelessly communicate with VAP 16 and engage in network communication via VAP 16. And the wireless terminal 12 can further include encryption logic, such as WEP to facilitate secure wireless communication with VAP 16.

Further, to support VoP network communications, the wireless terminal 12 can include components conventionally found in a VoP terminal. For example, the wireless terminal 12 can include voice interface components such as a microphone for receiving voice from a user and a speaker or earpiece for playing out voice to a user. And the wireless terminal 12 can include conversion circuitry for converting analog voice signals to digital form and for converting digital voice signals to analog form, as well as a suitable codec (encoder/decoder), such as G.723.1, enhanced variable rate codec (EVRC) or the like, for compressing and decompressing digitized voice signals.

Additionally, the wireless terminal 12 can include logic for packetizing and depacketizing digitized (e.g., compressed) voice signals and for communicating the packetized voice signals with a network entity such as call control device 26. For instance, the wireless terminal 12 may include a DHCP client for obtaining an IP address from a DHCP server such as DHCP server 30, and a TCP/IP client for engaging in TCP/IP communications. And the wireless terminal 12 may include logic such as a session initiation protocol (SIP) user agent or H.248/H.323 client application, for setting up a VoP communication session with or through a remote entity such as call control device 26, as well as logic such as a real-time transport protocol (RTP) client application, for communicating real-time VoP traffic.

Further, in the exemplary embodiment, the wireless terminal 12 may include components that allow a user to place and receive voice calls, as a telephone. For instance, the wireless terminal 12 may include a telephone keypad to allow a user to dial a phone number (which the wireless terminal might send as a SIP INVITE to the call control device so as to originate a call to that number), as well as logic to alert the user when there is an incoming call (e.g., in response to a SIP INVITE received from the call control device).

An exemplary VAP 16 can also take various forms. As a general matter, at its core, an exemplary VAP 16 will be a wireless access point, which (i) can engage in WLAN communication with one or more wireless terminals via air interface 14 and (ii) can engage in to packet communication via link 18 and over public network 20. As such, VAP 16 can include components commonly found in commercially available wireless access points, such as those manufactured by Linksys, D-Link and 3Com Corporation for instance. Further, in accordance with the exemplary embodiment, VAP 16 preferably includes VPN client logic with predefined security settings, so that, when VAP 16 is coupled with link 18, VAP 16 can establish a VPN tunnel over public network 20 with VAP server 22.

Figure 2:
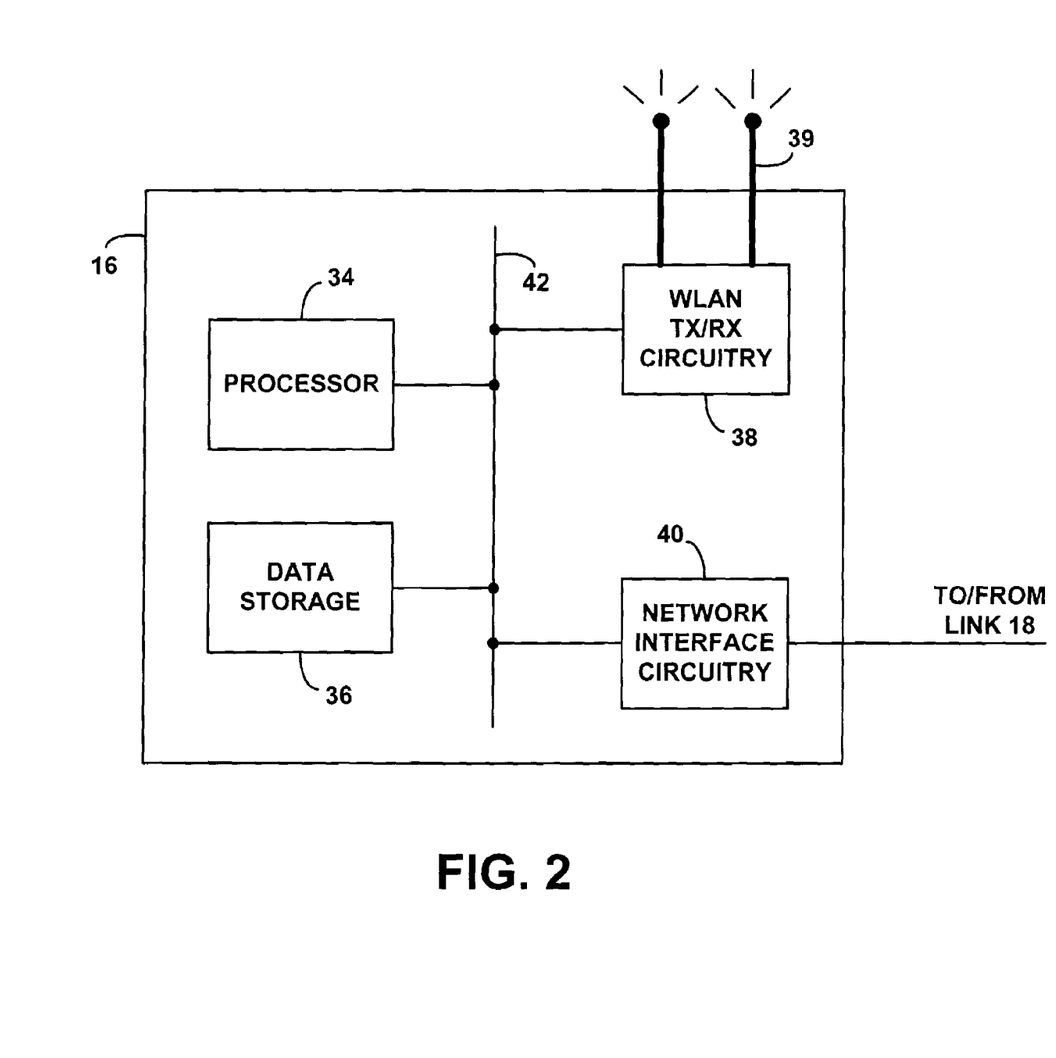
FIG. 2 is a block diagram of an exemplary voice access point.

FIG. 2 is a generalized block diagram of an exemplary VAP 16, showing some of the components that the VAP could include in accordance with the exemplary embodiment. As illustrated, the exemplary VAP 16 may include a processor 34, data storage 36, WLAN transmit/receive circuitry 38, and network interface circuitry 40, all of which could be linked together by a system bus 42 or other means within a VAP housing (e.g., injection molded plastic, not shown).

Generally speaking, WLAN transmit/receive circuitry 38 will operate in conjunction with one or more antennas 39, to provide a physical link via air interface 14 with wireless terminal 12 (and/or other wireless terminals operating in the coverage area of the VAP). Suitable arrangements for this sort of circuitry and antennas are well known in existing wireless access points and may vary depending on the air interface protocol used. Example air interface protocols, as noted above, could include 802.11, an 802.11 variant, Bluetooth or HomeRF, for instance. Currently, 802.11b or 802.11a is preferred. Further, like wireless terminal 12, VAP 16 could be a multi-mode device, capable of operating on more than one air interface protocol.

Network interface circuitry 40, in turn, functions to provide a physical connection to link 18. Thus, the network interface circuitry 40 could take various forms depending on the form of link 18. For instance, network interface circuitry 40 could be, or could include, an Ethernet network interface card (NIC) and port, a cable modem and coaxial cable port, and/or a DSL modem and RJ-11 port. Other examples are also possible.

Data storage 36 may include volatile and nonvolatile portions and preferably contains both program logic and reference data, and processor 34 may execute the program logic and refer to the reference data in order to carry out various functions.

For example, in order for VAP 16 to establish and carry on WLAN communication with a wireless terminal such as terminal 12, data storage 36 may include WLAN logic. According to 802.11 protocols, for instance, a wireless terminal could associate with a wireless access point such as VAP 16 through communication of an agreed SSID, and the wireless terminal may then include the SSID in communications that it sends to the access point. Thus, data storage 36 could contain data indicating one or more acceptable SSIDs for this purpose, and data storage 36 can include program logic executable by processor 34 to allow a wireless terminal to associate, and to receive from the wireless terminal WLAN communications that bear one of the acceptable SSIDs. Additionally, the data storage 36 can include encryption logic (e.g., WEP logic) to facilitate secure wireless communication with wireless terminal 12.

Further, in accordance with the exemplary embodiment, VAP 16 may be configured to allow DHCP passthrough. That way, when a wireless terminal such as wireless terminal 12 sends a DHCP request, the VAP 16 can allow the request to pass through the VPN tunnel to the remote network 24, and a DHCP server on the remote network could assign an IP address to the wireless terminal 12.

As another example, in order for VAP 16 to be able to engage in network communications with VAP server 22, data storage 36 may include a TCP/IP client application and may contain an indication of an IP address assigned statically or dynamically to the VAP 16. The IP address could be a simple IP address or a mobile IP address, and, in the exemplary embodiment, it could be assigned by a DHCP server communicatively linked with VAP 16.

And as yet another example, in order for VAP 16 to establish a VPN tunnel with VAP server 22 as noted above, data storage 36 may contain a predefined set of VPN security setting as well as logic operable by processor 34 to establish the VPN tunnel. The process of establishing the VPN tunnel could take various forms, depending on requirements of the VAP server for instance. Therefore, the particular parameters that make up the predefined set of VPN security settings could also take various forms.

For instance, a set of VPN security settings in data storage 36 for establishing a VPN tunnel between VAP 16 and VAP server 22 might include (i) a network address (e.g., IP address) or host name of VAP server 22, (ii) a digital certificate (or identifier or shared secret) to send to the VAP server when presented with a challenge, (iii) definitions of encryption algorithms (e.g., IPSec, GRE, L2F, PPTP, L2TP) and key sizes that the VAP 16 supports, and (iv) a certificate or key that can enable VAP 16 to validate a digital certificate received from VAP server 22. And the logic operable by processor 34 could define a conventional Internet Keyword Exchange (IKE) process, through which the VAP 16 and the VAP server 22 can agree on an encryption algorithm, key size, and key value to use for encryption/decryption of packet traffic.

In the exemplary embodiment, data storage 36 could contain multiple defined sets of VPN security settings, and each set could correspond with (i) a particular VAP server (on a particular remote network) and (ii) a particular SSID that a wireless terminal could use to associate with VAP 16 and when communicating with VAP 16 via WLAN air interface 14. This way, a wireless terminal that uses a given SSID may communicate through a given VPN tunnel from VAP 16 to a given VAP server on a given remote network, and the wireless terminal may thereby access a call control device on that given remote network. And at the same time, another wireless terminal that uses another SSID may communicate through another VPN tunnel from the same VAP 16 to another VAP server on another remote network, and the other wireless terminal may thereby access a call control device on that other remote network.

To correlate sets of VPN security settings with SSIDs, data storage 36 could simply include a translation table, which indicates which set of security settings, and/or which resulting VPN tunnel, should be used for transmission of data that came over WLAN air interface in connection with a given SSID. And to correlate sets of VPN security settings with VPN tunnels, each set could inherently designate the endpoint VAP server.

It should be understood, however, that in an alternative arrangement, VAP 16 could have just a single set of VPN security settings. Further, it is also possible that VAP 16 could recognize just a single SSID or could operate in still other ways.

In the exemplary embodiment, the one or more sets of VPN security settings that are contained in data storage 36 are preferably in data storage 36 before the VAP 16 is obtained by an end-user, so that the end-user does not need to learn the security settings and does not learn the security settings (beneficially, if the settings are confidential), and so that the VAP 16 can readily establish one or more VPN tunnels after the VAP 16 is connected with link 18 to the public packet network 20. For instance, during manufacture of the VAP 16, the settings could be hard coded into logic circuitry (e.g., firmware) or stored in non-volatile memory (e.g., ROM) in the VAP 16. Or a manufacturer or other distributor of the VAP 16 could otherwise program the settings into data storage 36 before distributing the VAP 16. (Alternatively, an end-user could program the settings into the VAP 16, e.g., through a web-based interface, for instance.)

As a specific example, as noted above, a company might distribute VAPs to its employees or customers, for the employees or customers to install on their home LANs (or other networks, in other areas). Before the company distributes the VAPs to the employees or customers, the company (or a VAP manufacturer or agent for the company) could program into the data storage 36 of each VAP a set of VPN security settings suitable for establishing a VPN tunnel with the company's VAP server 22. That way, a recipient end-user of the VAP 16 could connect the VAP 16 to link 18 and have it readily provide the user with remote voice connectivity to the company's call control device 26. And as another example, a telecommunications carrier could similarly sell or distribute VAPs to its subscribers, pre-provisioned with VPN security settings for establishing a VPN tunnel with a VAP server 22 on the carrier's core packet network, so as to allow the subscribers to place and receive voice calls via a call control system on the carrier's network.

According to the exemplary embodiment, the VPN-establishment logic could cause the processor 34 to establish a VPN tunnel with VAP server 22 (or multiple VPN tunnels, each with a respective VAP server) in response to various triggering events. For instance, the processor could establish the VPN tunnel in response to connection of the VAP 16 to link 18. To facilitate this, after the VAP 16 is powered up, the processor could execute logic that causes it to periodically check if a connection exists, such as by pinging VAP server 22, for instance. Once it determines that a connection exists, it may then use its defined security settings to establish a VPN tunnel. Alternatively, the logic could cause the processor to establish the VPN tunnel in response to a wireless terminal such as terminal 12 associating with the VAP 16. As noted above, then, it is further possible that the SSID used by the terminal could correlate with a particular set of VPN security settings, so the processor could use that particular set so as to establish a VPN tunnel to carry voice communications from that wireless terminal to a remote network. Further, the logic could cause the processor to periodically refresh the tunnel, so as to prevent a timeout. Other arrangements are also possible.

In turn, data storage 36 may contain logic executable by processor 34 (i) to tunnel VoP traffic (i.e., VoP bearer packets and VoP signaling packets) from wireless terminal 12 to VAP server 22 for transmission over remote network 24, and (ii) to receive VoP traffic via the VPN tunnel from VAP server 22 and to pass the VoP traffic via the WLAN air interface 14 to terminal 12. In this regard, as noted above, VoP traffic arriving over air interface 14 may come with an SSID or other parameter that signals to the processor 34 that the traffic should be sent over the VPN tunnel to VAP server 22, so processor 34 may send that traffic over the VPN tunnel to the VAP server 22. And VoP traffic arriving over the VPN tunnel destined for the wireless terminal 12 will come with a destination IP address of the wireless terminal, which the processor 34 could transmit over WLAN air interface 14 as broadcast packet data, for receipt by the wireless terminal 12.

Further, in the exemplary embodiment, data storage 36 may include packet filtering logic executable by the processor to restrict outbound VPN-tunnel communications to voice traffic, such as VoP traffic for instance (or to some other type of traffic). This logic could operate in a variety of ways. As an example, VoP traffic from wireless terminal 12 could carry a VoP identification parameter in a predefined header or payload position, and processor 34 could note that parameter and responsively send the traffic along the VPN tunnel. For instance, if the wireless terminal 12 uses SIP to set up a VoP session with call control device 26, processor 34 could look at the SIP messages that flow between the wireless terminal and the call control device, and could (i) see that the messages concern a VoP session and (ii) learn a session ID being used for the VoP session. When VAP 16 then receives packets bearing that session ID (or other related signaling packets), the processor can route those packets over the VPN tunnel, and the processor could drop (bar) or route locally any other packets. Alternatively, the wireless terminal could mark all VoP packets as voice traffic, specifically in order to tell the VAP 16 that the packets should be sent over the VPN tunnel. And again, other variations are possible.

Figure 3:
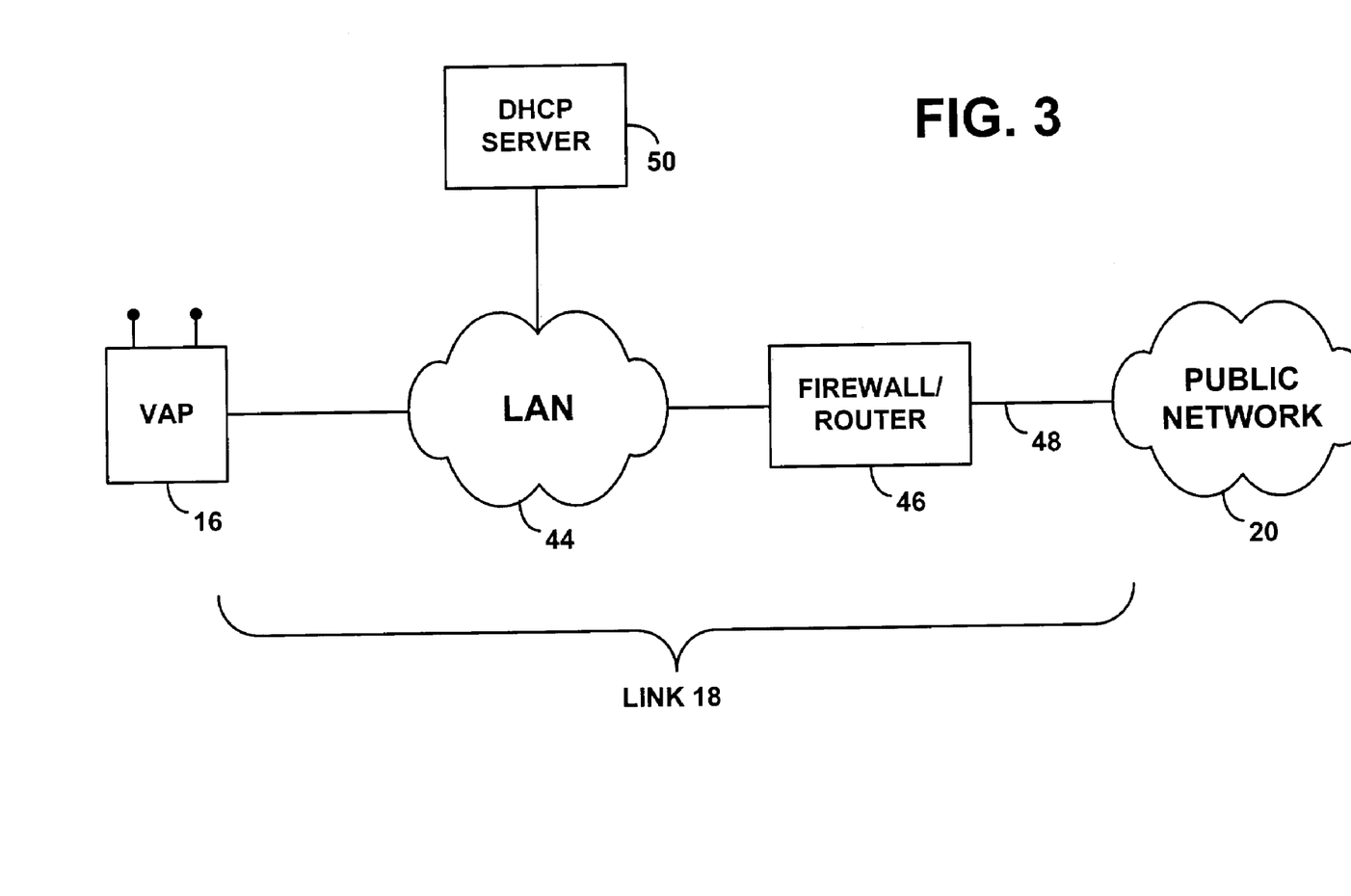
FIG. 3 is a block diagram of a link between the exemplary voice access point and a public network such as the Internet.

Continuing with reference to FIG. 1, link 18 between VAP 16 and the public network 20 could also take various forms, as suggested above. For example, the link could be a direct or point-to-point link. And as another example, the link can include a LAN or other sort of distribution system that provides connectivity between VAP 16 and the public network 20. FIG. 3 depicts one such arrangement, by way of example.

As shown in FIG. 3, link 18 could include a LAN 44 (or, more generally, any public or private network) coupled with a firewall/router 46 that provides connectivity over a link 48 with public network 20. Firewall/router 46 could be a conventional LAN router, and the firewall function could be a NAT function for instance. And link 48 could be a T1 line, cable modem system, DSL system, or any other suitable link.

Further, sitting separately on LAN 44, or perhaps integrated as part of firewall/router 46, is a DHCP server 50 that functions to assign network addresses within a domain of the LAN 44. Thus, when VAP 16 powers up on LAN 44, or at another time, VAP 16 can acquire a local network address from DHCP server 50, which VAP 16 can then use to communicate in the LAN 44. And firewall/router 46 might translate between that local network address and a public network address routable on public network 20. Alternatively, VAP 16 could have a global network address routable on network 20.

Turning back to FIG. 1, public network 20 can also take various forms. In the exemplary embodiment, for instance, the public network 20 would be the Internet. However, it could take other forms as well.

And VAP server 22 can similarly take various forms. As a general matter, an exemplary VAP server 22 will function as a VPN terminator for terminating VPN tunnels from VAPs such as VAP 16, and will further function as a firewall to protect remote network 24. Alternatively, these functions could be split into two separate devices, namely, a VPN terminator and a firewall. Such VPN terminators and firewalls, as well as combination VPN terminators/firewalls are commercially available from companies such as 3Com, Cisco and Symantec, for instance.

Next, remote network 24 could also take various forms. By way of example, remote network 24 can be a private local, metropolitan or wide area packet network operated by any sort or entity. For instance, the remote network 24 could be an enterprise LAN that normally functions to interconnect employees of the enterprise when the employees are at work. Or the remote network 24 could be a telecommunication carrier's core signaling or transport network, such as the type of network that an interexchange carrier might use to route calls between local exchange carriers, for instance. Other examples are also possible.

The remote network 24 is designated as a "remote" network because in most cases it will span an area that is physically remote from VAP 16, separated by public network 20. However, it is equally possible that the remote network could be close to or coincident with the location of the VAP 16 in certain implementations.

In the exemplary embodiment, DHCP server 30 on the remote network 24 functions to assign network addresses dynamically to devices via DHCP. Thus, for instance, the wireless terminal 12 can send a DHCP request, which passes through VAP 16 to the VAP server 22, and which the VAP server 22 routes to DHCP server 30 as a default DHCP server for remote network 24. In the exemplary embodiment, DHCP server 30 then assigns an IP address to wireless terminal 12. Further, in the exemplary embodiment, DHCP server 30 also includes in its DHCP response an indication of the IP address of call control device 26 on remote network 24, so that wireless terminal will know where to find the call control device 26 to be able to initiate a voice call. Although DHCP server 30 is shown separate from VAP sever 22, the DHCP server could instead be a function of VAP server 22.

Authentication server 32, in turn, functions to authenticate user/device credentials and to supply call control device 26 with telephony profiles that define telephony services authorized for use by given user/device. To carry out this function, authentication server 32 could be a RADIUS server and could include or have access to a user profile database (not shown) and/or other reference data and logic. The user profile database and/or other reference data could be distributed for scalability and redundancy.

In turn, call control device 26 can also take various forms and could in fact be made up of one or more devices or other components. As a general matter, an exemplary call control device 26 will function to interface between remote network 24 and voice transport network 28. Thus, for instance, if remote network 24 is a packet network (e.g., an Ethernet LAN) and voice transport network 28 is a circuit-switched telephony network such as the PSTN, then call control device 26 may function to bridge a VoP communication over remote network 24 with a circuit-switched voice call over voice transport network 28. Or if remote network 24 is a packet network and voice transport network 28 is also a packet network, call control device may function to bridge VoP communication over remote network 24 with VoP communication over voice transport network 28. Devices capable of doing this are commercially available. Examples include intelligent voice gateways, computer telephony interfaces, IP-PBXs, switches, proxy servers, media gateway controllers, and internet telephony gateways.

The exemplary call control device 26 will include a processor and data storage, and the data storage will contain program instructions and reference data to facilitate carrying out the call control function. For example, the data storage may include a translation table that correlates (i) a VoP session with wireless terminal 12 with (ii) a call over voice transport network 28. Further, the data storage may include a local copy of a user profile that defines telephony services authorized for use by wireless terminal 12 and/or by a user of wireless terminal 12, such as limits on the types of calls that the user can place or receive, for instance.

In the exemplary embodiment, after wireless terminal 12 acquires an IP address on remote network 24, the wireless terminal may register with the call control device 26 (through any agreed registration scheme), and the call control device 26 may responsively query the authentication server 32 to validate the wireless terminal 12 (or the user of the terminal). Alternatively or additionally, the call control device 26 could query the authentication server 32 each time an effort is made to place a voice call to or from wireless terminal 12. Upon successful authentication, the authentication server 32 may send a service profile to the call control device 26, which the call control device 26 can then store and use when providing service for the wireless terminal.

Further, the call control device 26 may have a relationship with DHCP server 30, so that the call control device 26 can determine the network address assigned to wireless terminal 12 when a call for the wireless terminal comes into the call control device 26 from voice transport network 28. (For instance, DHCP server 30 could programmatically report the wireless terminal's IP address to the call control device 26 when DHCP server 30 assigns the address.)

Finally, the voice transport network 28 can also take various forms. As noted above, for instance, the voice transport network 28 could be a packet-switched network, such as the Internet. Or the voice transport network 28 could be a circuit-switched network such as the PSTN. Alternatively, the voice transport network 28 could include both packet-switched and circuit-switched components.

Further, as noted above, the voice transport network 28 could be part of remote network 24, or vice versa. For instance, remote network 24 could ordinarily function to carry VoP communications between entities on the remote network 24, and call control device 26 could function as a controller for those voice calls, as an IP-PBX server for instance. Thus, wireless terminal 12 could place a voice call through VAP 16 to (or via) an entity on remote network 24 and could receive a voice call through VAP 16 from an entity on remote network 24.

2. Exemplary Operation

Referring next to FIGS. 4-7, several flow charts are provided to help illustrate how the exemplary embodiment can operate in practice. It should be understood, however, that many variations on the processes illustrated are possible.

Figure 4:
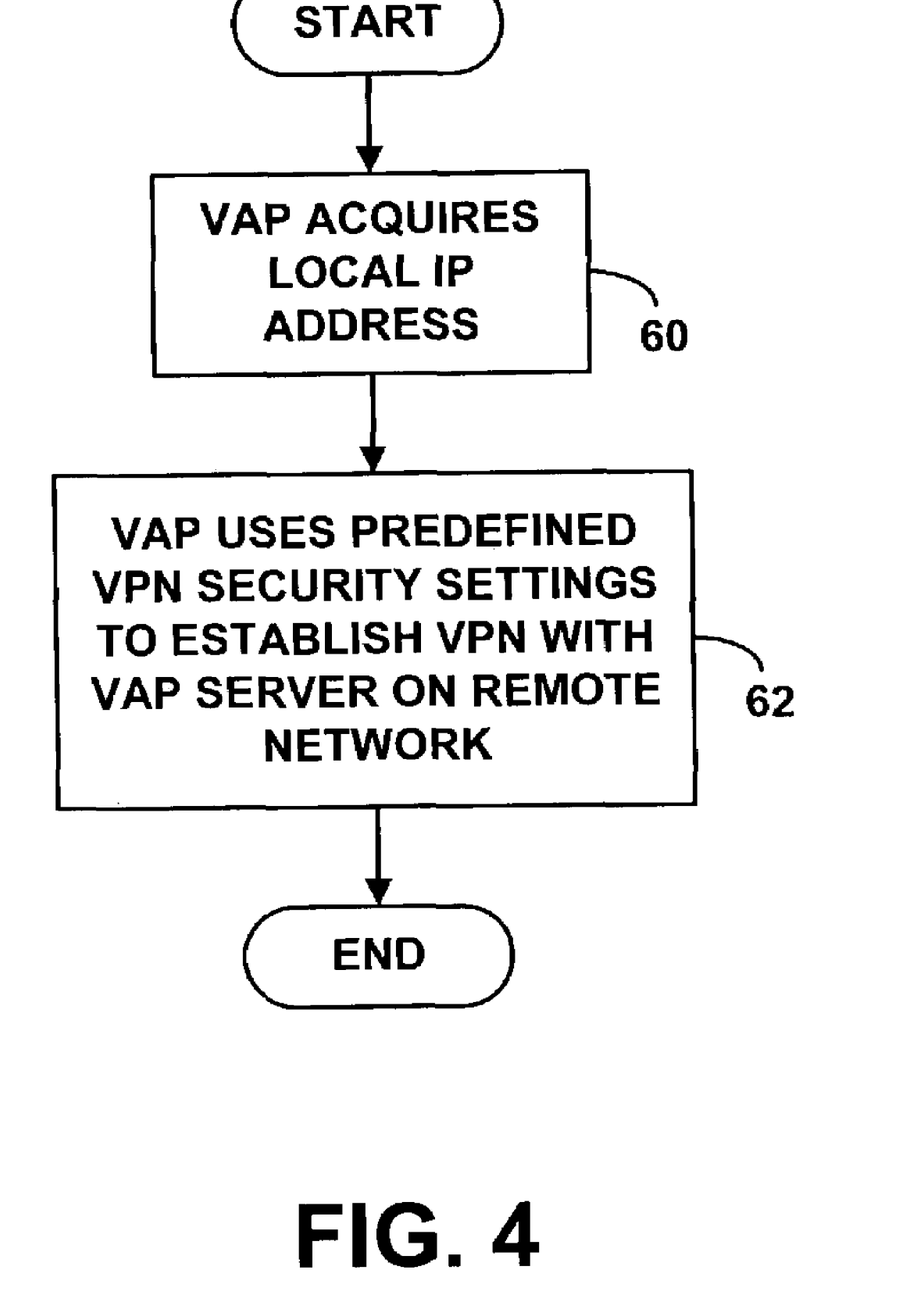
FIG. 4 is a flow chart depicting functions that can be involved in initiating a voice access point according to the exemplary embodiment.

To begin with, FIG. 4 depicts functions that can be involved in initiating VAP 16, such as upon connection of VAP 16 to link 18 of FIG. 3. As shown in FIG. 4, at block 60, the VAP 16 may first acquire a local IP address, from DHCP server 50, so as to be able to communicate on LAN 44. And at block 62, once the VAP 16 has an IP address, it will use its predefined VPN security settings to establish a VPN tunnel with the VAP server 22.

Figure 5:
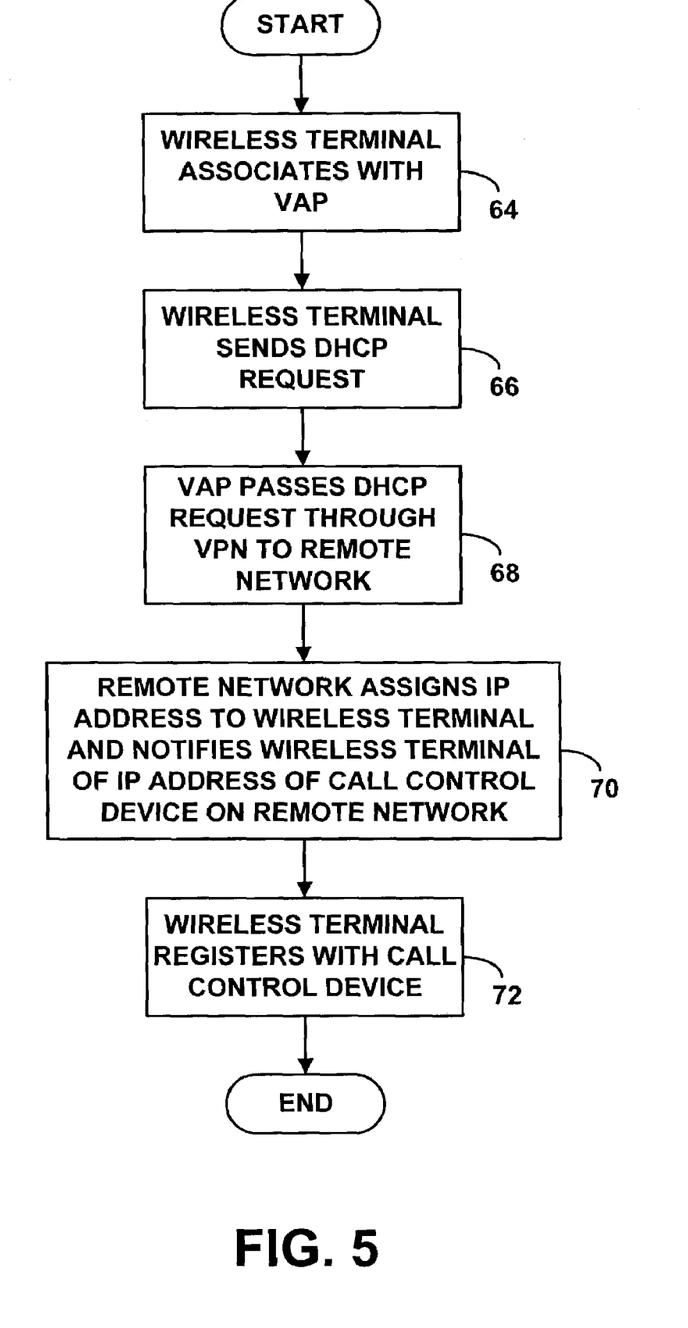
FIG. 5 is a flow chart depicting functions that can be involved in establishing a remote network link with a wireless voice terminal via a voice access point according to the exemplary embodiment.

FIG. 5 next depicts functions that can be involved in wireless terminal 12 establishing a network link with remote network 24. As shown in FIG. 5, at block 64, wireless terminal 12 will first associate with VAP 16 with a predetermined SSID. At block 66, once associated, the wireless terminal 12 will send a DHCP request, seeking an IP address. In the exemplary embodiment, at block 68, the VAP 16 will allow that DHCP request to pass through the VPN tunnel to the VAP server 22. And at block 70, the DHCP server 30 on the remote network will issue an IP address to the wireless terminal 12 and, in the exemplary embodiment, provide the wireless terminal 12 with the IP address of call control device 26. At block 72, the wireless terminal 12 will then register with the call control device 26.

Figure 6:
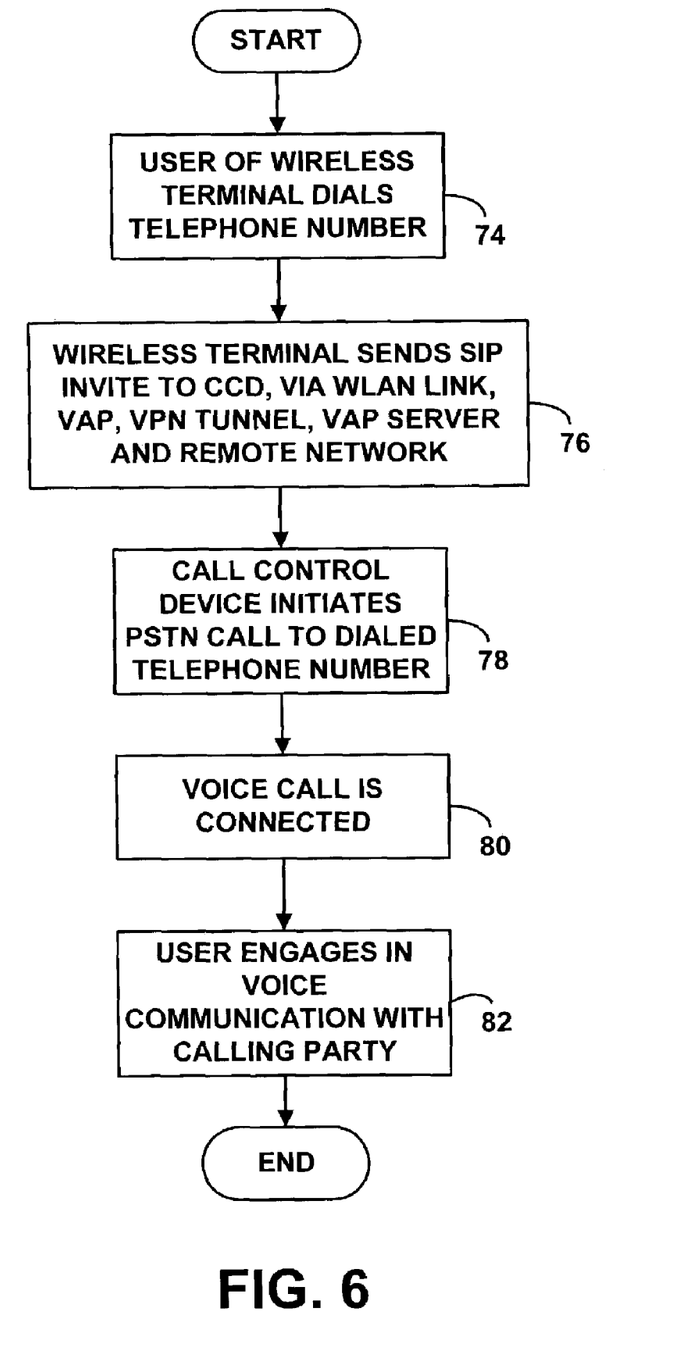
FIG. 6 is a flow chart depicting functions that can be involved in a wireless voice terminal placing a voice call via a voice access point according to the exemplary embodiment.

FIG. 6 next depicts functions that can be involved in placing a voice call from wireless terminal 12 to a telephone number on the PSTN. As shown in FIG. 6, at block 74, a user of the wireless terminal 12 dials a telephone number and directs the wireless terminal 12 to send the dialed digits to the call control device.

At block 76, a SIP user agent client on the wireless terminal 12 could then responsively generate and send a SIP INVITE message to the IP address of call control device 26, via a communication path comprising the WLAN air interface 14, the VAP 16, the VPN tunnel, the VAP server 22 and the remote network 24. The SIP INVITE would indicate the dialed number within the INVITE message and seek to set up a VoP/RTP session with or through the call control device 26. And at block 78, call control device 26 then initiates a PSTN call to the dialed number.

At block 80, after additional signaling, the call is connected. And at block 82, a user of wireless terminal 12 then engages in a voice call with the called party, during which voice is carried as VoP/RTP between the wireless terminal 12 and the call control device 26 and conventionally as a circuit-switched call over the PSTN.

Figure 7:
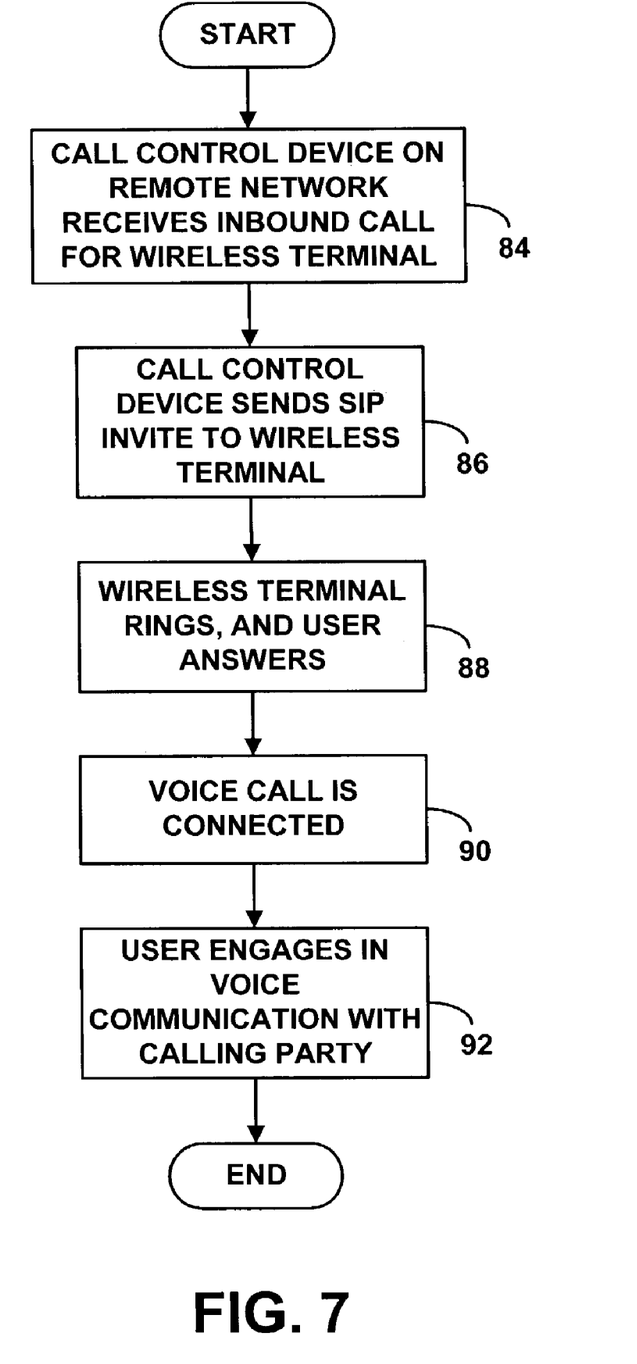
FIG. 7 is a flow chart depicting functions that can be involved in a wireless voice terminal receiving a voice call via a voice access point according to the exemplary embodiment.

Finally, FIG. 7 depicts functions that can be involved in connecting a voice call from the PSTN to wireless terminal 12. As shown in FIG. 7, at block 84, call control device 26 receives an inbound call destined for a telephone number that call control device 26 associates with wireless terminal 12. At block 86, call control device 26 responsively sends a SIP INVITE to the IP address of the wireless terminal 12, seeking to set up a VoP/RTP session with the wireless terminal. When the VAP server 22 sees the IP message, it then routes it over the VPN tunnel to VAP 16, which transmits the message over WLAN air interface 14 to the wireless terminal 12.

At block 88, an application on the wireless terminal 12 may responsively ring or otherwise alert a user of the wireless terminal 12, and the user may answer the call. At block 90, after additional signaling, the call is connected. And at block 92, a user of wireless terminal then engages in a voice call with the calling party, during which voice is carried as VoP/RTP between the wireless terminal 12 and the call control device 26 and conventionally as a circuit-switched call over the PSTN.

3. Exemplary Advantages

With the benefit of the exemplary embodiment, as noted above, a user of a wireless voice terminal operating in a WLAN can readily place and receive voice calls via a call control server on a remote network, such as a remote enterprise network or carrier's network. Advantageously, NAT can be a non-issue in an embodiment where the VAP provides a VPN tunnel to the remote network and a DHCP server on the remote network assigns a remote network IP address for use by the wireless terminal. Thus, the wireless terminal can successfully set up and engage in VoP communication with the remote call control device and/or any other entity on the remote network.

Further, with appropriate restrictions, the VAP can avoid passing traffic between (i) the wireless terminal or VPN tunnel and (ii) a LAN that provides connectivity to the Internet. Thus, the VAP can allow a wireless terminal to engage in voice calls via the remote network without compromising the security of the LAN.

Still further, a VAP that comes pre-provisioned with VPN security settings to establish a VPN tunnel with a VAP server on a given remote network can be readily installed and operative on virtually any LAN or other link with the Internet. Thus, an end-user or network administrator who acquires a VAP configured for use with a given remote network can install the VAP and quickly allow suitably equipped and authorized wireless voice terminals to begin placing and receiving voice calls via the remote network's call control device.

Additionally, a VAP that comes pre-provisioned with a number of VPN security settings for establishing VPN tunnels with multiple different VAP servers can readily allow access to multiple different remote voice calling systems. For instance, a user of a wireless voice terminal issued by (or registered with) an enterprise network might associate with the VAP using a given SSID, and then readily place and receive voice calls through a VPN tunnel from the VAP to that enterprise network. And a user of another wireless voice terminal issued by (or registered with) a telecom carrier's system might associate with the VAP using another SSID, and then readily place and receive voice calls through a VPN tunnel from the VAP to that carrier's network.

4. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. A voice communication system comprising:
   a wireless access point connectable in a local area network (LAN); and a virtual private network (VPN) terminator on a remote network;

wherein the wireless access point includes an integrated VPN client configured with a predefined set of VPN security parameters, wherein, after the wireless access point is connected in the LAN, the wireless access point uses the predefined set of VPN security parameters to establish a VPN tunnel with the VPN terminator on the remote network via a communication path comprising the LAN and a packet network, wherein, after establishing the VPN tunnel, the wireless access point receives outgoing voice-over-packet (VoP) traffic transmitted over an air interface from a wireless terminal and sends the outgoing VoP traffic via the VPN tunnel to the VPN terminator, and the wireless access point receives incoming VoP traffic transmitted over the VPN tunnel from the VPN terminator and sends the incoming VoP traffic over the air interface to the wireless terminal, whereby VoP traffic thus flows between the wireless terminal and the VPN terminator over a path comprising the air interface, the wireless access point and the VPN tunnel, and wherein the VPN terminator receives the outgoing VoP traffic transmitted over the VPN tunnel from the wireless access point and sends the outgoing VoP traffic over the remote network to a call control device that provides connectivity with a voice transport network, and the VPN terminator receives the incoming VoP traffic transmitted over the remote network from the call control device and sends the incoming VoP traffic over the VPN tunnel to the wireless access point, whereby VoP traffic thus flows between the wireless terminal and the voice transport network over a path comprising the air interface, the wireless access point, the VPN tunnel, the VPN terminator, the remote network and the call control device.

2. The voice communication system of claim 1, wherein a plurality of wireless terminals communicate simultaneously via the wireless access point, over the VPN tunnel.

3. The voice communication system of claim 1, wherein the wireless access point communicates the incoming VoP traffic and outgoing VoP traffic with the wireless terminal according to a WLAN protocol.

4. The voice communication system of claim 3, wherein the WLAN protocol is selected from the group consisting of 802.11, an 802.11 variant, Bluetooth and HomeRF.

5. The voice communication system of claim 1, wherein the incoming VoP traffic and outgoing VoP traffic comprises digitized voice encapsulated in data packets.

6. The voice communication system of claim 1, further comprising a dynamic host control protocol (DHCP) server on the remote network, wherein the DHCP server assigns to the wireless terminal an IP address in a domain of the remote network.

7. The voice communication system of claim 6, wherein the DHCP server resides functionally on the VPN terminator.

8. The voice communication system of claim 1, wherein the call control device is selected from the group consisting of a voice gateway, a computer telephony interface, a switch, a media gateway controller, a private branch exchange server and a proxy server.

9. The voice communication system of claim 1, wherein the voice transport network is selected from the group consisting of the public switched telephone network and the Internet.

10. The voice communication system of claim 1, further comprising an authentication server on the remote network, wherein the authentication server authenticates the wireless terminal when the wireless terminal seeks to engage in voice communication via the call control device.

11. A voice communication system comprising:
a wireless access point connectable in a local area network (LAN), the wireless access point including an integrated virtual private network (VPN) client configured with a predefined set of VPN security parameters, wherein, after the wireless access point is connected in the LAN, the wireless access point uses the predefined set of VPN security parameters to establish a VPN tunnel with a VPN terminator on a remote network via a communication path comprising the LAN and a packet network, wherein, after establishing the VPN tunnel, the wireless access point receives outgoing voice-over-packet (VoP) traffic transmitted over an air interface from a wireless terminal and sends the outgoing VoP traffic via the VPN tunnel to the VPN terminator, and the wireless access point receives incoming VoP traffic transmitted over the VPN tunnel from the VPN terminator and sends the incoming VoP traffic over the air interface to the wireless terminal, whereby VoP traffic thus flows between the wireless terminal and the VPN terminator over a path comprising the air interface, the wireless access point and the VPN tunnel, and wherein the wireless access point further includes logic operable to receive a communication from the wireless terminal, to determine whether the communication constitutes voice traffic, to pass the communication onto the VPN for transmission to the VPN terminator if the determination is that the communication constitutes voice traffic, and to bar the communication from transmission over the VPN if the determination is that the communication does not constitute voice traffic.

12. The voice communication system of claim 11, wherein the wireless access point further includes logic to correlate the wireless terminal with the VPN tunnel.

13. A voice communication system comprising:
a wireless access point connectable in a local area network (LAN), the wireless access point including an integrated virtual private network (VPN) client configured with a predefined set of VPN security parameters, wherein, after the wireless access point is connected in the LAN, the wireless access point uses the predefined set of VPN security parameters to establish a VPN tunnel with a VPN terminator on a remote network via a communication path comprising the LAN and a packet network, wherein, after establishing the VPN tunnel, the wireless access point receives outgoing voice-over-packet (VoP) traffic transmitted over an air interface from a wireless terminal and sends the outgoing VoP traffic via the VPN tunnel to the VPN terminator, and the wireless access point receives incoming VoP traffic transmitted over the VPN tunnel from the VPN terminator and sends the incoming VoP traffic over the air interface to the wireless terminal, whereby VoP traffic thus flows between the wireless terminal and the VPN terminator over a path comprising the air interface, the wireless access point and the VPN tunnel, wherein the VPN client is configured with a plurality of predefined sets of security settings, and wherein, after the wireless access point is connected to the LAN, the wireless access point uses the plurality of sets to establish a plurality of VPN tunnels, wherein each VPN tunnel extends from the VPN client to a respective VPN terminator on a respective remote network, including a given VPN tunnel extending from the VPN client to a given VPN terminator on a given remote network, and wherein the wireless access point further includes VPN-selection logic operable (i) to determine a network identifier in an access request transmitted over the air interface from the wireless terminal, (ii) to use the network identifier as a basis to select the given VPN tunnel from the plurality of VPN tunnels, and (iii) to forward a dynamic host control protocol (DHCP) request from the wireless terminal over the selected VPN tunnel.

14. The voice communication system of claim 13, wherein the network identifier comprises a service set identifier (SSID).

15. The voice communication system of claim 13, further comprising a DHCP server on the given remote network, wherein the DHCP server receives the DHCP request and responsively assigns to the wireless terminal an IP address in a domain of the given remote network.

16. A voice communication method comprising:

connecting, to a local area network (LAN), a wireless access point that includes an integrated virtual private network (VPN) client configured with a predefined set of VPN security parameters, wherein the wireless access point then uses the predefined set of VPN security parameters to establish a VPN tunnel with a VPN terminator on a remote network, via a communication path comprising the LAN and a packet network;

the wireless access point receiving outgoing voice-over-packet (VoP) traffic transmitted over an air interface from a wireless terminal and sending the outgoing VoP traffic via the VPN tunnel to the remotely located VPN terminator, and the wireless access point receiving incoming VoP traffic transmitted over the VPN tunnel from the VPN terminator and sending the incoming VoP traffic over the air interface to the wireless terminal, whereby VoP traffic thus flows between the wireless terminal and the VPN terminator over a path comprising the air interface, the wireless access point and the VPN tunnel; and the VPN terminator receiving the outgoing VoP traffic transmitted over the VPN tunnel from the wireless access point and sending the outgoing VoP traffic over the remote network to a call control device that provides connectivity with a voice transport network, and the VPN terminator receiving the incoming VoP traffic transmitted over the remote network from the call control device and sending the incoming VoP traffic over the VPN tunnel to the wireless access point, whereby VoP traffic thus flows between the wireless terminal and the voice transport network over a path comprising the air interface, the wireless access point, the VPN tunnel, the VPN terminator, the remote network and the call control device.

17. The voice communication method of claim 16, wherein the air interface is a WLAN air interface.

18. The voice communication method of claim 17, wherein the WLAN air interface comprises an interface selected from the group consisting of an 802.11 interface, an 802.11-variant interface, a Bluetooth interface, and a HomeRF interface.

19. The voice communication method of claim 16, wherein the incoming VoP traffic and outgoing VoP traffic comprises digitized voice encapsulated in data packets.

20. The voice communication method of claim 16, further comprising:

a dynamic host control protocol (DHCP) server on the remote network assigning to the wireless terminal an IP address in a domain of the remote network.

21. The voice communication method of claim 16, further comprising:

an authentication server on the remote network authenticating the wireless terminal when the wireless terminal seeks to engage in voice communication via the call control device.

22. A voice communication method comprising:

connecting, to a local area network (LAN), a wireless access point that includes an integrated virtual private network (VPN) client configured with a predefined set of VPN security parameters, wherein the wireless access point then uses the predefined set of VPN security parameters to establish a VPN tunnel with a VPN terminator on a remote network, via a communication path comprising the LAN and a packet network;

the wireless access point receiving outgoing voice-over-packet (VoP) traffic transmitted over an air interface from a wireless terminal and sending the outgoing VoP traffic via the VPN tunnel to the remotely located VPN terminator, and the wireless access point receiving incoming VoP traffic transmitted over the VPN tunnel from the VPN terminator and sending the incoming VoP traffic over the air interface to the wireless terminal, whereby VoP traffic thus flows between the wireless terminal and the VPN terminator over a path comprising the air interface, the wireless access point and the VPN tunnel; and the wireless access point determining whether a communication from the wireless terminal constitutes voice traffic, passing the communication onto the VPN for transmission to the VPN terminator if the determination is that the communication constitutes voice traffic, and barring the communication from transmission over the VPN if the determination is that the communication does not constitute voice traffic.

23. The voice communication method of claim 22 further comprising:

the wireless access point correlating the wireless terminal with the VPN tunnel.

24. A voice communication method comprising:

connecting, to a local area network (LAN), a wireless access point that includes an integrated virtual private network (VPN) client configured with a predefined set of VPN security parameters, wherein the wireless access point then uses the predefined set of VPN security parameters to establish a VPN tunnel with a VPN terminator on a remote network, via a communication path comprising the LAN and a packet network; and the wireless access point receiving outgoing voice-over-packet (VoP) traffic transmitted over an air interface from a wireless terminal and sending the outgoing VoP traffic via the VPN tunnel to the remotely located VPN terminator, and the wireless access point receiving incoming VoP traffic transmitted over the VPN tunnel from the VPN terminator and sending the incoming VoP traffic over the air interface to the wireless terminal, whereby VoP traffic thus flows between the wireless terminal and the VPN terminator over a path comprising the air interface, the wireless access point and the VPN tunnel, wherein the VPN client is configured with a plurality of predefined sets of security settings, and wherein the method further comprises: (i) after the wireless access point is connected to the LAN, the wireless access point using the plurality of sets to establish a plurality of VPN tunnels, wherein each VPN tunnel extends from the VPN client to a respective VPN terminator on a respective remote network, including a given VPN tunnel extending from the VPN client to a given VPN terminator on a given remote network; (ii) the wireless access point reading a network identifier from an access request transmitted over the air interface from the wireless terminal; (iii) the wireless access point using the network identifier as a basis to select the given VPN tunnel from the plurality of VPN tunnels; and (iv) the wireless access point forwarding a dynamic host control protocol (DHCP) request from the wireless terminal over the selected VPN tunnel.

25. The voice communication method of claim 24, wherein the network identifier comprises a service set identifier (SSID).

26. The voice communication method of claim 25 further comprising:

a DHCP server on the given remote network receiving the DHCP request and responsively assigning to the wireless terminal an IP address in a domain of the given remote network.

\* \* \* \* \*